Figure 1:
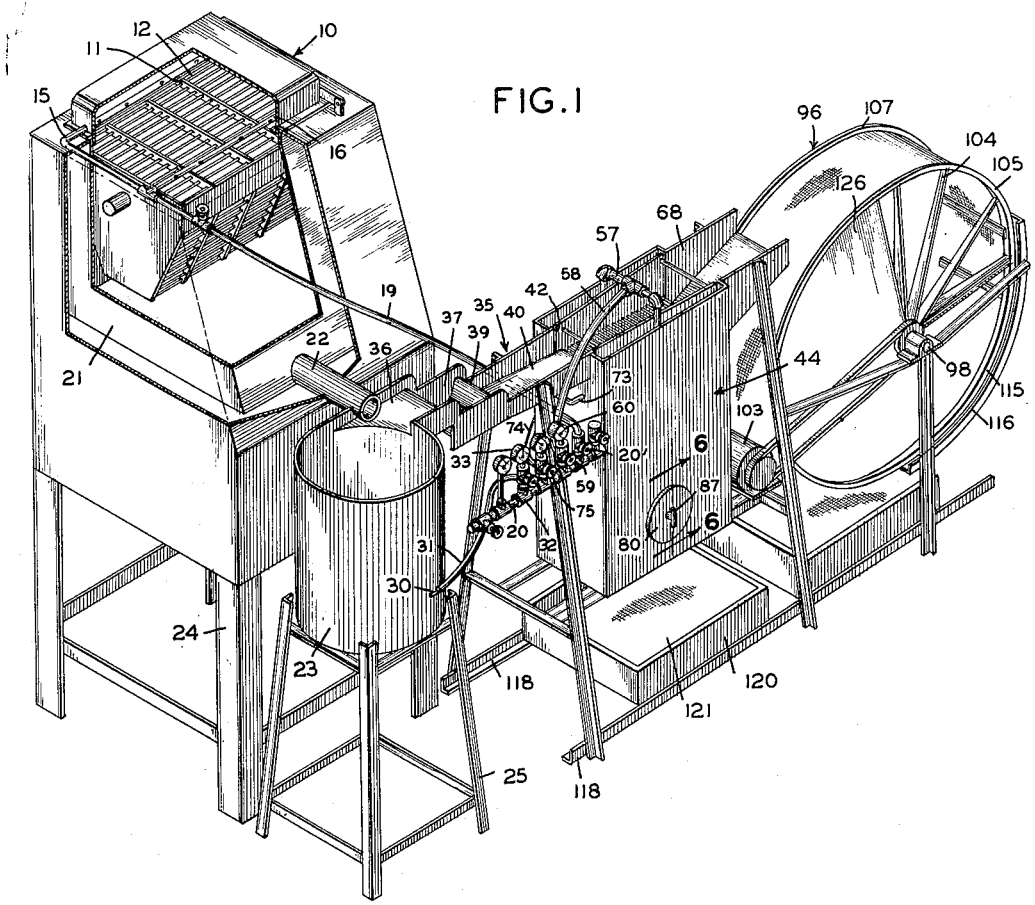

Jan. 23, 1962 W. A. ZARTMAN 3,017,661
METHOD FOR SEPARATION OF MEAT AND BONE
Filed March 16, 1959 3 Sheets-Sheet 1

INVENTOR
W.A. ZARTMAN

BY *[signature]*
ATTORNEY

Jan. 23, 1962  W. A. ZARTMAN  3,017,661
METHOD FOR SEPARATION OF MEAT AND BONE
Filed March 16, 1959  3 Sheets-Sheet 2

INVENTOR
W.A. ZARTMAN
BY
ATTORNEY

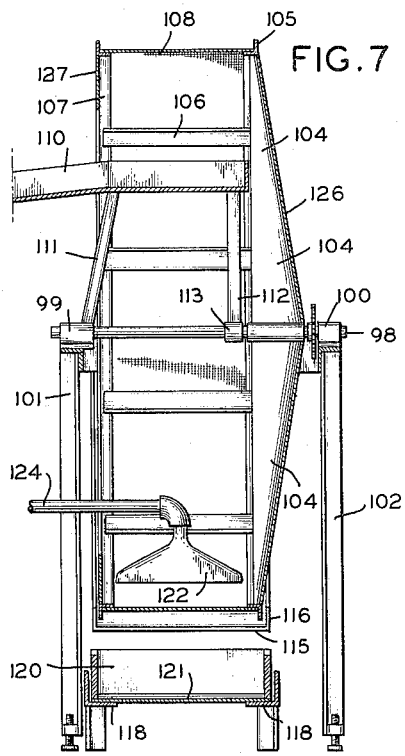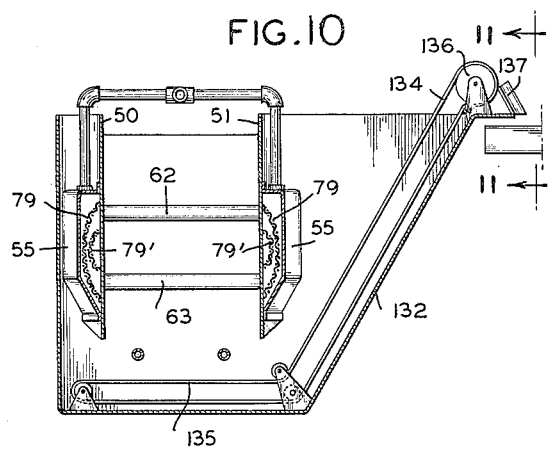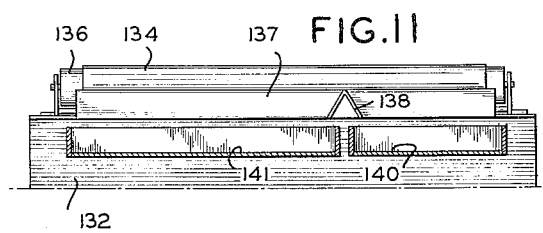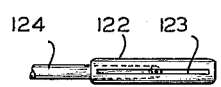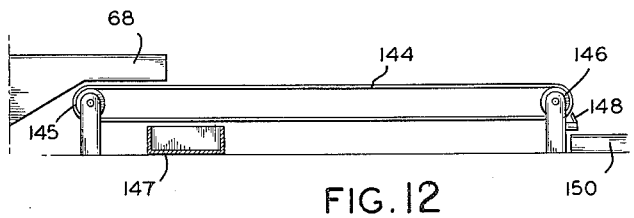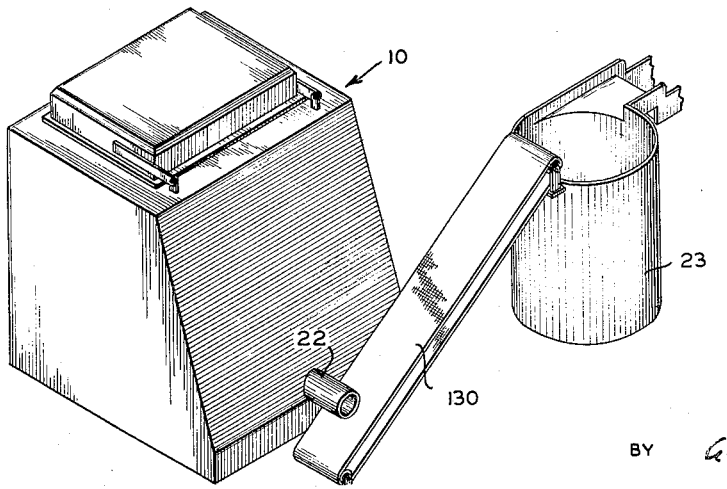

United States Patent Office 3,017,661
Patented Jan. 23, 1962

3,017,661
METHOD FOR SEPARATION OF
MEAT AND BONE
Willmar A. Zartman, Atlanta, Ga., assignor to Meat Separator Corporation, Atlanta, Ga.
Filed Mar. 16, 1959, Ser. No. 799,717
5 Claims. (Cl. 17—45)

This invention relates to the separation of materials including the separation of relatively soft and lightweight materials such as meat from harder and heavier substances such as bone, gristle and the like.

The invention relates more particularly to the separation of meat from the portions of poultry that are difficult and time consuming to separate, such as the neck and back.

Heretofore various methods and apparatus have been proposed for the separation of relatively soft lightweight materials such as meat from harder heavier materials such as bone and the like. These have been employed in the separation of meats of various kinds such as poultry, sea food, and nuts from bones, shell and other inedible substances.

In the processing of poultry, it has become the practice to remove the head, feet, feathers and viscera and to market the portions having edible meat in a package, the portions oftentimes being cut up into varying numbers of pieces and in various ways. Oftentimes pieces of like nature such as legs, thighs, wings, breasts, backs and necks are sold separately.

In view of the fact that the neck and back of poultry contain little meat which is easy to remove, the unit price of necks and backs has been relatively low and the labor and expense of handling these has sometimes been so costly that the handling has been unprofitable or at a loss. Various products such as chicken pies, pureed baby foods, soups, sandwich spreads and the like have used a limited quantity of neck meat but only a small fraction of that which could be profitably used if such meat were available entirely free from bones.

Various methods of removing neck meat from the bones have been employed including mechanical impact separation such as that described in Patents 2,734,537 and 2,734,540 to H. F. Greisler. However the meat obtained from such mechanical manipulation has sometimes contained bone fragments and pin bones which are difficult to remove during inspection. One reason is that the pin bones are numerous and tiny and frequently embedded in the meat and therefore not visible. As a result it has not been commercially feasible to remove all bone matter from the meat even after careful inspection. This has limited the market for such meat and caused the cost of handling and inspecting such meat to remain high.

Another method that has been suggested is to break up the pieces into tiny fragments which are placed in a brine solution whose specific gravity is controlled to permit the bones to sink but cause the meat to float. This has the disadvantage of soaking the meat in brine which may effect its flavor, making it less desirable or unsuitable for certain uses. Furthermore, it is doubtful whether such method removes poultry neck pin bones. Another disadvantage is that relatively expensive apparatus is required for the practice of the foregoing method. Furthermore, changing and adjusting the specific gravity of the brine solution within the required narrow limits is difficult and time consuming.

A further method suggested is to finely comminute the meat and bone and to separate the same in a centrifuge. However, in many products, such as meat pies, soups and meat salads, it is desirable to use larger pieces of meat instead of only that which is finely comminuted. Thus, the market for meat produced by such method is greatly limited. Furthermore, the comminution of meat promotes the loss of its natural juices, thus depriving it of essential flavor characteristics.

Until the present invention no satisfactory relatively inexpensive method has been known for commercially separating the meat from the necks and backs of poultry with the result that profits from the handling of the necks and backs have been lots which might otherwise have been realized.

It is an object of the present invention to provide a method and apparatus for separating relatively soft and lightweight substances from harder and heavier materials and particularly for separating cooked poultry meat from the neck and back portions.

A further object of the invention is the separation of a comminuted mixture of cooked poultry meat from bone and bone fragments intermingled therewith to produce a meat product free of bones.

A further object of the invention is the provision of a novel separator for separating relatively light and heavy materials and in which adjustment of the operation to compensate for variable substances and conditions may be easily and constantly made without loss of time.

Figure 2:
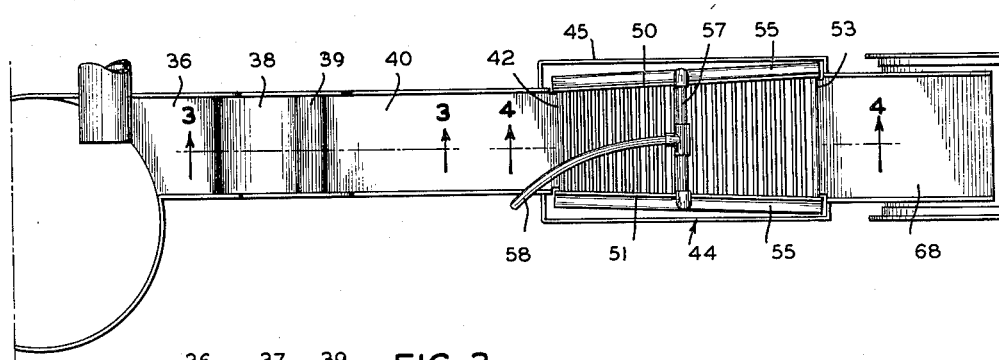
Figure 3:
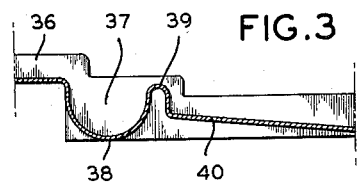
Figure 4:
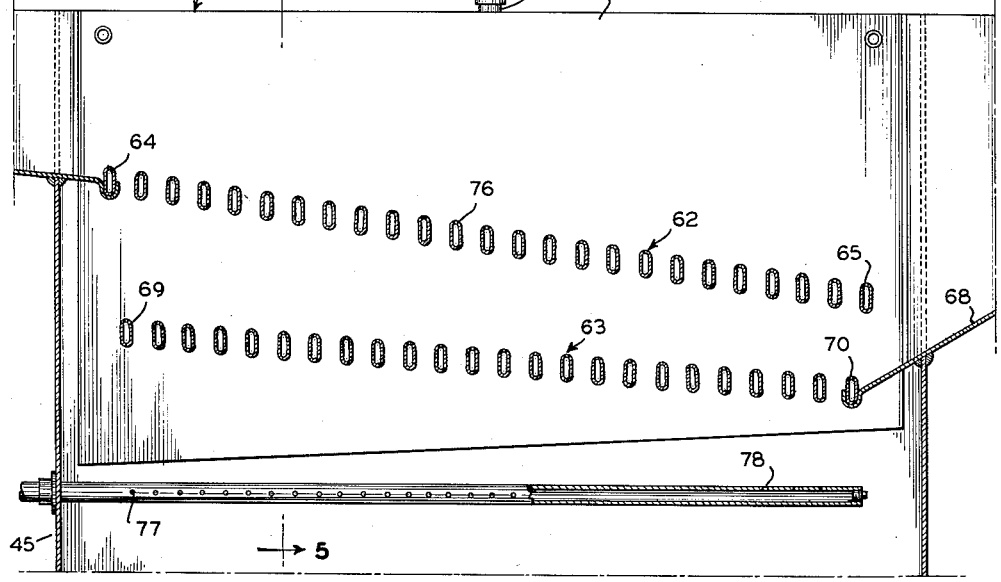
Figure 5:
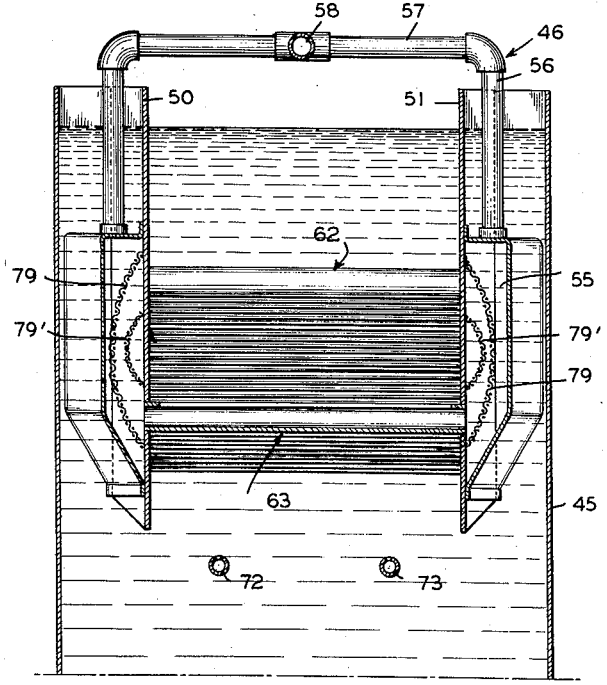
Figure 6:
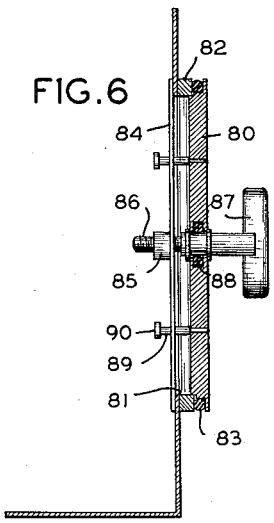

These and other objects of the invention will become apparent from the following description taken in conjunction with the accompanying drawings wherein:

FIG. 1 is a perspective of apparatus constructed in accordance with the present invention;

FIG. 2, a fragmentary plan view to an enlarged scale of a portion of the apparatus of FIG. 1;

FIG. 3, a section on the line 3—3 of FIG. 2;

FIG. 4, a section to an enlarged scale on the line 4—4 of FIG. 2;

FIG. 5, a section on the line 5—5 of FIG. 4;

FIG. 6, a section to an enlarged scale on the line 6—6 of FIG. 1;

FIG. 7, a vertical section to an enlarged scale of the water separator wheel illustrated in FIG. 1;

FIG. 8, a bottom view of the wheel cleaning nozzle of FIG. 7;

FIG. 9, a perspective of a modified arrangement of the mechanical and centrifugal separators of FIG. 1 in which a conveyor is employed for carrying materials received from the mechanical separator to the centrifugal separator;

FIG. 10, a partial section to a reduced scale of a modified form of the waterlift apparatus in which an endless conveyor is employed to remove materials from thereunder;

FIG. 11, a section on the line 11—11 of FIG. 10; and

FIG. 12, an elevation, partly in section, of a modified water separator conveyor.

Briefly stated the invention contemplates the use of a mechanical separator such as the impact type illustrated in the Patents 2,734,537 and 2,734,540, previously mentioned, in which all of the meat and some bone is removed; this product is washed into a centrifugal separator tank in which heavier bone particles sink and lighter bone particles and the meat are discharged at the side and flow over one or more steps or drops to further separate the particles and then flow into a tank having gently rising currents of water at different levels producing a gentle cushion of water of substantial depth which is adjusted to permit the bone particles to sink but to maintain the meat particles at the upper level from which they are discharged onto a screen which separates the meat from the water.

With particular reference to the drawings, a mechanical separator 10 is disclosed having a basket 11 whose side, top and bottom walls consist of a grid formed by spaced rods 12. The mounting and construction of the mechanical separator may be similar to that of the Patents 2,734,537 and 2,734,540 although the present invention is not limited to the use of a mechanical separator of this structure. Also it is contemplated that with the additional separating means provided in accordance with the present invention, that the spacing between the rods 12 may be slightly greater than that contemplated in such patents in order to permit larger pieces of meat to pass between such rods. Various means may be provided to oscillate the basket 11 in order to separate meat and some bone particles from bones within the basket, such meat and bone particles passing out of the basket through the grid of the sides and bottom.

In order to assist in the mechanical separation within the basket, a pair of pipes 15 and 16 are mounted just above the top and adjacent to the sides of the basket. These pipes are provided with a few spaced apertures or jet openings on the sides facing each other, and with a larger number of more closely spaced apertures or jet openings along their underside. In order to supply water to the conduits 15 and 16, a supply pipe 19 is connected thereto and receives water from a main conduit 20 through a valve 20'. The side jets from the pipes 15 and 16 supply a small amount of water into the basket in order to lubricate the material therein and to decrease the likelihood of its sticking together in lumps. The jets on the under sides of the pipes 15 and 16 spray against the sides of the walls of the separator 10 to constantly remove meat and bone fragments deposited thereon. The meat and bone fragments are washed to the bottom of a container 21 from which they are discharged through conduit 22 into the top of a centrifugal separator drum 23.

The mechanical separator 10 is mounted in raised elevation on a conventional stand 24 and the drum 23 is likewise mounted in raised elevation on a conventional stand 25.

Conduit 22 discharges the water, meat, and bone mixture or slurry into the top of drum 23 at one side thereof in order to promote a rotary motion or circular flow of liquid within the drum. However, rotary flow within the drum is increased greatly by jet pipe 30 mounted in the side of the drum in its lower portion so as to discharge substantially tangentially to the inner surface of the drum. Jet pipe 30 is supplied with water from pipe 31 connected by a T 32 to the main conduit 20. The pressure of the water fed to the pipe 31 is indicated by a gauge 33.

In the drum 23, the rotating water carries the floating lighter meat and bone particles around its outer periphery, the heavier bone particles sinking to the bottom from which they are periodically removed.

At one side of the upper rim of the drum 23, a trough 35 is connected. The trough 35 may consist of one or more sections but it has been found advantageous to use a pair of drops or waterfalls of sufficient depth to facilitate separation of any particles adhering together. In order to accomplish this, the trough has a first channel 36 which receives the discharge from the drum and is connected to a first fall or drop 37 having a curved depressed bottom 38 to dam a small quantity of water and cause tumbling or circular motion to separate and maintain the separation of the particles.

The curved bottom 38 extends upwardly to a ledge 39 at its discharge side over which the slurry falls into channel 40, such fall further tending to separate and maintain separation of the particles. In order to maintain the flow of slurry, the trough 35 is downwardly inclined from its receiving end at the drum 23 to its discharge end. At the discharge end the trough is connected to the inlet 42 of a waterlift separator 44.

The waterlift separator 44 includes a relatively narrow tank 45 of substantial depth and within the upper portion of which is mounted a waterlift unit 46. The waterlift unit includes a pair of inner side walls 50 and 51 which are spaced at the inlet end 42 in accordance with the spacing of the sides of the trough 35 and which diverge and have a wider spaced outlet end 53 in accordance with the spacing of the outlet end of the tank 45.

With particular reference to FIGS. 2, 4 and 5, a water housing or jacket 55 is mounted on each of the walls 50 and 51 extending from the bottom to slightly above the center of the wall and has connected to its upper portion a pipe 56 connected to a horizontal pipe 57 for receiving water through a common pipe 58. The pipe 58 is connected to a T 59 to which the main conduit 20 is attached, and has a gauge 60 for indicating the pressure therein.

Extending between the walls 50 and 51 and in communication with the water jacket 55 are upper and lower rows of conduits 62 and 63 respectively. The upper row has its first conduit 64 engaged with the channel 40 and its lowermost conduit 65 mounted slightly above the bottom of a discharge channel 68. The lower row of conduits 63 is mounted at less inclination than the upper row, the uppermost conduit 69 being mounted substantially beneath the conduit 64 and the lowermost conduit 70 being mounted a lesser distance beneath the conduit 65 and engages the lowermost end of the discharge channel 68.

In order to supply additional water within the tank 44 and beneath the rows of conduits 62 and 63, additional pipes 72 and 73 are provided. These pipes extend longitudinally of the tank and are spaced from each other and slightly inwardly of the sides 50 and 51 of the waterlift unit. Pipes 72 and 73 are connected to conduit 74 which is attached to the master supply pipe 20 by a T 75.

Instead of using round pipe for the conduits 62 and 63, oval pipe like that illustrated is preferred as such pipe more nearly produces uniform pressures along its length, particularly over a range of pressures. A narrow slot 76 is provided along the tops of the conduits or, alternately, closely spaced apertures may be used.

The conduits in the rows 62 and 63 are staggered with respect to each other in order to provide a more even cushion of water and to eliminate down currents which tend to occur adjacent to an upward flow. In order to further reduce the likelihood of down currents within the tank, the pipes 72 and 73 are provided with closely spaced apertures 77 along their upper portions located at about a 45° angle from the vertical and may have additional apertures 78 on the upper surfaces of the pipes adjacent to their discharge end for additional lifting effect in this area if needed in a particular installation. The apertures 77 and 78 may be inclined at about 30° from a radial line toward the discharge end of the tank in order to follow the movement of water in the tank.

As a further means to produce an even flow of water to the conduits between the water jackets, screens 79, 79' are mounted lengthwise within the jackets. They serve to break up the flow from the pipes 56 and to distribute the same more evenly to the conduits.

In the operation of the waterlift separator, the pipes 72 and 73 supply a rising current of water beneath the row of conduits 63. Conduits 63 produce upward flow substantially uniformly thereabove and the water supply from the pipes 72 and 73 tends to offset the natural tendency of the upward lift adjacent to the pipes 63 from producing downward flow. The result is a gentle upward cushion of water above the row of conduits 63. Similarly the water rising from the conduits 63 and the pipes 72 and 73 tends to offset the tendency of the water above the row 62 from producing downward currents as a result of the upward currents produced by the water flowing upwardly from the conduits in the row 62. As a result a gentle upwardly rising cushion of water is provided above the row 62.

The slurry of water, meat and bone particles entering the waterlift separator between the walls 50 and 51 is gently lifted as it is discharged over the conduits 62 and the lighter meats are floated across the waterlift tank to the discharge channel 68. Heavier meat particles and bone drop between the conduits 62 and are cushioned upwardly by the flow between the upper and lower rows of conduits. In view of the fact that the slurry is constantly moving along the tank from the inlet toward the outlet, the meat particles which are dropped below the first line are carried toward the outlet, the heavier bone particles dropping past the line 63 to the bottom of the tank.

The operator of the device by adjusting the water pressure in the conduit rows 62 and 63 and the pipes 72 and 73 may vary the upward lift within the tank and thereby adjust the operation within small limits to permit a greater or smaller amount of meat to be discharged.

Since some of the meat particles may be relatively heavy and some of the bone particles relatively light, the water pressure is adjusted to permit some meat particles to fall to the bottom of the tank. Since most of the bone particles are relatively heavy, it will be found during operation that approximately the first two-thirds of the bottom of the tank from the inlet end will have a deposit of bone fragments and the last one-third a deposit of meat fragments with some bone. This last third may be removed and reprocessed if desired.

A removable door 80 is provided to permit access to the lower portion of the tank through an opening 81 in the lower side wall of the tank. The opening 81 has an outwardly projecting ring or flange 82 which is engaged by a resilient sealing ring 83 mounted in the outer rim of the door 80. The door is held in position in the opening by an elongated bar or strap member 84 having a threaded central member 85 engaged by a threaded shaft 86 extending from the handle 87 which is rotatably received through the center of the door, suitable sealing means 88 being provided to prevent leakage around the shaft. The bar 84 is positioned adjacent to the rear face of the door by studs 89 projecting therefrom having enlarged heads 90 and which loosely extend through the bar. In order to remove the door from the position of FIG. 6, the handle is rotated to produce axial movement of the strap 84 away from the door. After this is done, the strap 84 may be tilted to permit its withdrawal through the opening.

As earlier mentioned, the walls 50 and 51 of the waterlift unit diverge toward the outlet and the bottom of the outlet is lower than that of the inlet. Thus a progressively wider channel is provided to accommodate the increased flow of water resulting from that added by the waterlift unit.

At the outlet end of the waterlift unit, the discharge channel 68 conveys the slurry onto the upper rim of a water separator and inspection wheel 96. The wheel is mounted on a horizontal shaft 98 journaled in bearings 99 and 100 carried by suitable legs or supports 101 and 102. Suitable driving means such as motor 103 is provided for driving the wheel. Extending outwardly from the shaft adjacent to the end carried by the bearing 100 are a plurality of spokes 104 which are attached to the rim 105 of the wheel. Spaced from and attached to the rim 105 by cross members 106 is a second rim 107. A screen or apertured sheet member 108 is attached to the periphery of the wheel intermediate the rims 105, 107. In order to dispose of water passing through the screen from the discharge channel 68, a trough 110 is mounted by struts 111 and 112 on the bearing 99 and sleeve 113 on the shaft 98 respectively.

On the opposite side of the wheel from the trough 68 an arcuate guide plate 115 is mounted adjacent to the outer surface of the wheel and such guide plate 115 has a flange 116 at either side to prevent loss of material therefrom. Beneath the wheel a trackway is formed of opposed angle iron members 118 between which receptacles 120 may be slidably mounted for receiving material from the guide plate 115. The receptacles 120 preferably have apertured or screen-type bottoms 121.

In order to assure the dislodging of all of the meat from the screen, a nozzle 122, of substantially the width of the wheel, is mounted on the inner side of the screen and has a discharge opening 123 directed against the screen. Fluid such as water or air may be introduced into the nozzle by means of pipe 124 to dislodge any material remaining on the screen. Material which falls off of the screen onto the guide plate 115 will slide down into the nearest receptacle. In order to protect the operators and to minimize the splashing of water on the surroundings, the wheel may have a cover 126 on its inner side adjacent the spokes and a partial cover 127 on its outer side extending inwardly from the rim.

Various modifications in the practice of the invention are contemplated. For example as indicated in FIG. 9, the mechanical separator unit 10 may be mounted at a lower level and the material discharged from the pipe 22 may be received on a perforated endless conveyor belt 130 which elevates the material and discharges it into the drum 23.

Another modification is that indicated in FIGS. 10 and 11. In these, the waterlift tank has one side wall 132 extending at an angle in order to permit the mounting of an endless conveyor 134 within the tank. Such conveyor operates with a run 135 under the waterlift unit and conveys bone particles and meat thereon over the upper roller 136 into engagement with a scraper 137. As indicated in FIG. 11, the scraper has a divider 138 which is positioned approximately one-third of the distance from the discharge end of the waterlift unit and separates the material on such third from the material on the remainder of the belt, such materials being dislodged into receptacles 140 and 141. The materials in receptacle 140 will normally consist primarily of meat with a small amount of bone and these may be manually or by conveyor placed into the drum 23 or into the trough leading into the waterlift tank for additional processing.

In FIG. 12 there is illustrated a flat water separator and inspection conveyor consisting of a conveyor belt 144 of apertured flexible sheet material operating about the spaced rollers 145, 146. The discharge channel 68 from the waterlift tank is mounted over one end of the conveyor and a drain sump 147 is mounted therebeneath. At the other end of the conveyor suitable scraper means 148 may be provided if desired for removing material from the wheel for discharge into a receptacle 150.

In the operation of the device the neck or back pieces or other portions are placed in the mechanical separator and manipulated so that relatively small pieces of meat and bone fragments are discharged through the grid of the basket. These may be in stuck together condition and incompletely separated due to the mechanical action of the separator. Water is used to wash these down into the lower portion of the mechanical separator and they are discharged through the pipe 22 into the top of the drum 23.

In the drum 23 the water slurry of meat and bone particles is whirled around the sides with the result that some of the heavier bones sink to the bottom and the lighter bones and meat flow over the outlet into the trough.

In the trough the fluid mixture is passed over one or more falls with accompanying turbulence and movement of material thereunder, thus subjecting the same to forces tending to separate and maintain the separation of the individual particles.

The material is then carried with a slow forward motion into the upper portion of the waterlift tank 44 in which the magnitude of the gently rising currents at different levels is adjusted to float most of the meat but not the bone out of the discharge onto the water separator screen.

The bones collected at the bottom of the waterlift tank are removed from time to time and the small amount of meat which collects there may be removed and reprocessed. After passing onto the drainage screen, on which it may be inspected as desired, the meat is dislodged under the action of gravity together with air or water jets or a scraper as desired.

Accordingly it will be understood that the invention includes initially mechanically separating meat and bone particles from the main portion of the bone. The meat and bone particles are then suspended in water in a centrifugal separator where heavier bone particles sink and other materials in the water overflow. Then the meat and lighter bone particles are subjected to further separating forces within the liquid including by turbulence of the liquid and are then flowed without turbulence into a relatively deep reservoir of gently rising currents providing a cushion, the magnitude of which is closely controlled in order to lift the slightly lighter meat particles for discharge from the reservoir and to permit the slightly heavier bone particles to sink therein. The meat is then separated from the water by passing onto a perforate sheet such as a screen or the like from which it is removed for collection into containers.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. The method of separating meat from bone comprising mechanically removing meat and bone fragments from the main portion of the bone, washing the meat and bone fragments into a drum, rotating the water with the meat and bone fragments within the drum in order to maintain lighter particles of meat and bone fragments in the outer portion thereof, adding water to cause the drum to overflow, agitating the water and the meat and bone fragments which have overflowed in order to promote their separation, and slowly flowing the water with the separated meat and bone fragments into a reservoir of substantial depth, producing gentle upward currents of water across the reservoir, regulating the magnitude of the upward currents to permit all of the bone and only a small portion of the meat to sink, discharging the water and the lighter particles of meat from the reservoir, and separating the meat from the water.

2. The method of separating a mixture of bone fragments of varying size from meat portions of varying size, comprising making a water slurry of the mixture, agitating the slurry to separate and maintain the separation of the fragments and portions, passing the slurry slowly through a relatively deep channel, and producing gentle upward currents in the channel of sufficient magnitude to maintain the greater part of the meat portions in the upper portion of the channel but of insufficient magnitude to prevent the sinking of the bone fragments.

3. The method of claim 2 and separating the meat portions from the water by passing the water and meat portions in the upper portion of the channel onto a screen.

4. The method of claim 2, and continuously removing the sunken part of the meat portions to a higher elevation and repassing such meat portions through said channel.

5. The method of producing bone-free meat fragments from bones having meat thereon of a specific gravity generally slightly higher than that of the meat and in which the specific gravity of both the meat and the bones is generally slightly higher than that of water, comprising removing meat off of the bone to form a mixture of meat and bone fragments, agitating the mixture in a water bath to produce discrete meat and bone fragments in such bath, flowing the discrete fragments in a reservoir of water and overflowing the reservoir at a remote location to produce slow surface movement of the water and the floating portions of the mixture toward said overflow location, inducing upward localized water currents in the reservoir beneath the mixture sufficient to maintain substantially all of the meat fragments at and immediately adjacent to the surface but insufficient to float the ordinary bone fragments, whereby substantially all of the meat fragments pass out of the reservoir at the overflow location and substantially all of the bone fragments sink in the reservoir, and separating the meat from the water.

References Cited in the file of this patent

UNITED STATES PATENTS

| Number | Name | Date |
|---|---|---|
| 93,060 | Coleman | July 27, 1869 |
| 1,716,309 | Fournier | June 4, 1929 |
| 1,822,276 | Dunkley | Sept. 8, 1931 |
| 2,331,135 | Ovestrud | Oct. 5, 1943 |
| 2,386,713 | Pharo | Oct. 9, 1945 |
| 2,631,726 | Auer | Mar. 17, 1953 |
| 2,734,540 | Geisler | Feb. 14, 1956 |
| 2,745,547 | Wrege | May 15, 1956 |